US005465776A

United States Patent [19]
Mirza

[11] Patent Number: 5,465,776
[45] Date of Patent: Nov. 14, 1995

[54] WINDOW SHADE

[76] Inventor: Fernand Mirza, 13506 Hartland, Van Nuys, Calif. 91405

[21] Appl. No.: 199,092

[22] Filed: Feb. 22, 1994

[51] Int. Cl.⁶ ........................................................ E06B 9/00
[52] U.S. Cl. ...................... 160/368.1; 160/370.21
[58] Field of Search ..................... 160/370.2 R, 370.2 A, 160/370.2 B, 330, 368.1; 248/205.5, 206.1, 206.2; 24/115 G, 49 S, 57, 115 M; 296/97.7, 97.8, 97.9

[56] References Cited

U.S. PATENT DOCUMENTS

| 2,044,520 | 6/1936 | Weiant | 248/206.1 X |
| 2,784,426 | 11/1988 | Mannisto-Iches | |
| 4,893,668 | 1/1990 | Nomura | |
| 5,078,356 | 1/1992 | Adams | 248/206.2 |
| 5,197,166 | 3/1993 | Meier et al. | 24/115 G |

FOREIGN PATENT DOCUMENTS 552961  5/1923  France ................. 248/206.1

Primary Examiner—Blair M. Johnson
Attorney, Agent, or Firm—Frank L. Zugelter

[57] ABSTRACT

A window shade manufacture (20, 60, 64) for eliminating light, glare or the like, or achieving a non-observation purpose, through a vehicular or other window pane (21). A collapsible curtain (22) having a hem (30) is supported by a cord (34) that projects beyond the hem (30) to form cord extensions (35). Suction cup members (40) through which the cord extensions (35) project apply the curtain (22) to the window pane (21) while releasably slidable button members (38) are mounted on the cord's extensions (35) beyond the members (40). Members (42) slide into proximate positions adjacent their corresponding suction cup members (40), wherever the latter may be applied to the window pane (21), and thereat produce a desired slack or tension in the cord (34) disposed between the spaced apart suction cup members (40). Collapsible curtain (22) is positionable along the cord 34 as desired to achieve the noted purposes, and the manufacture is tucked away in a relatively small compact bag (27) when not in use. Embodiments also include a knot (62) as a substitute for a button member (38) and additional applying means 70 where the shade is to be used on a slanted window pane (65).

23 Claims, 3 Drawing Sheets

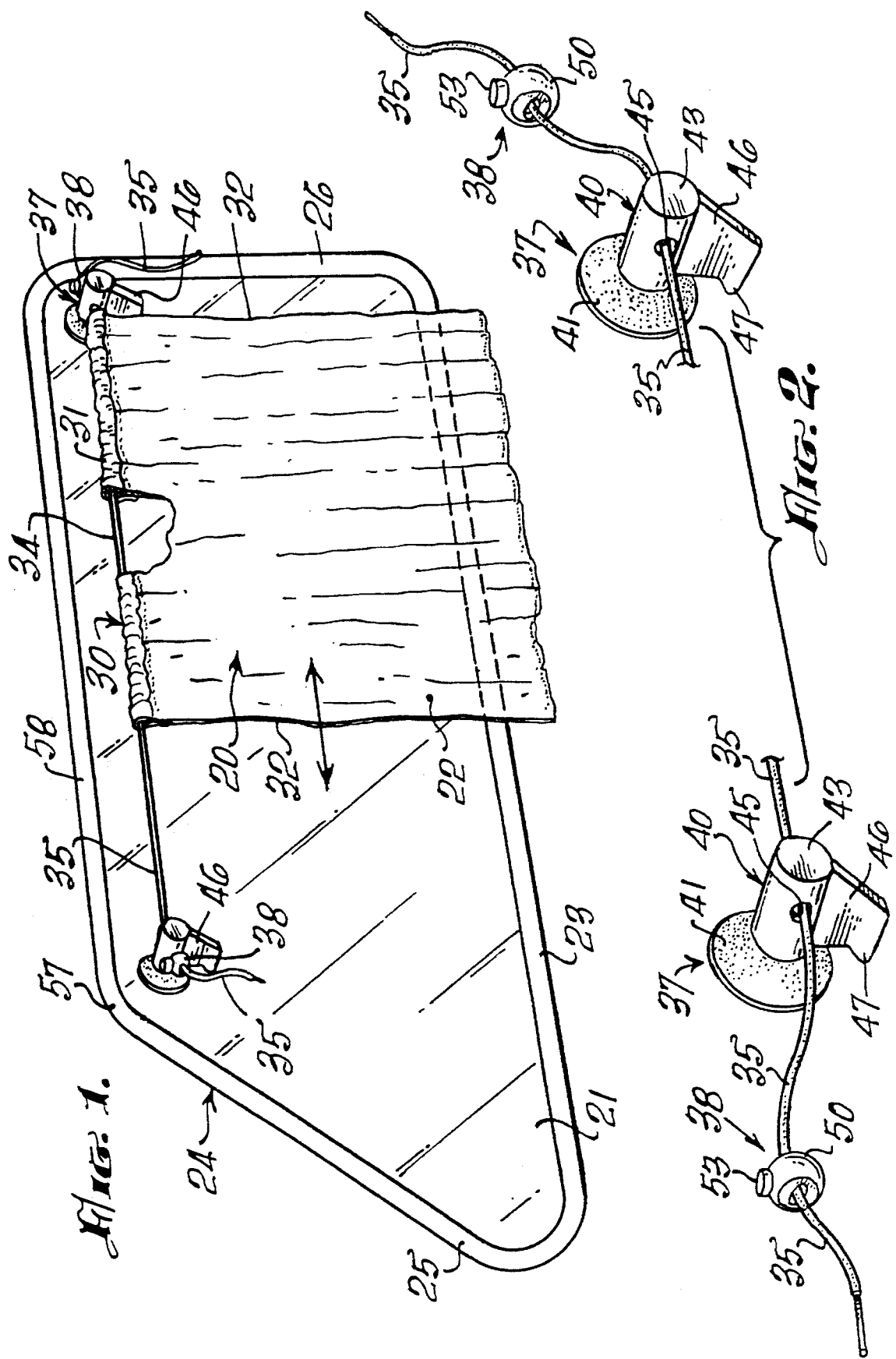

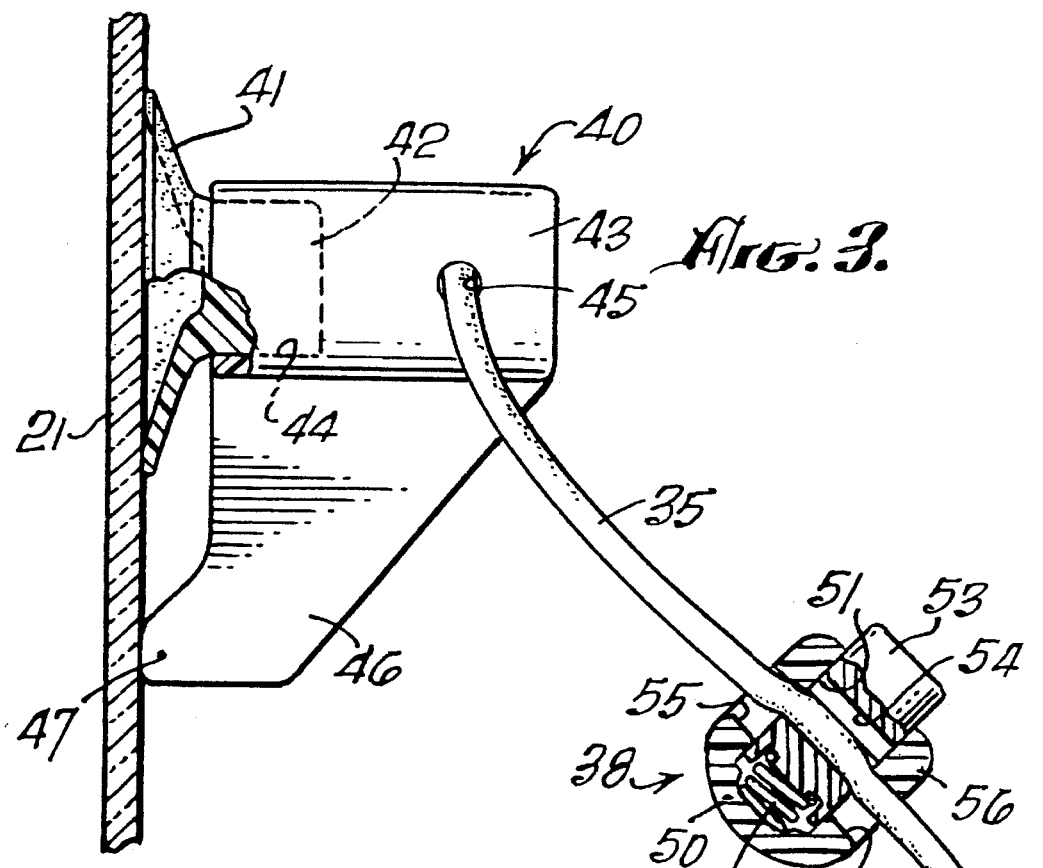
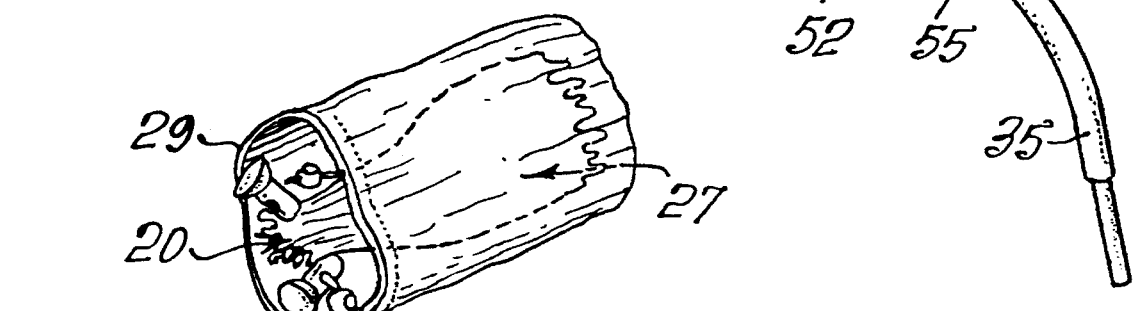
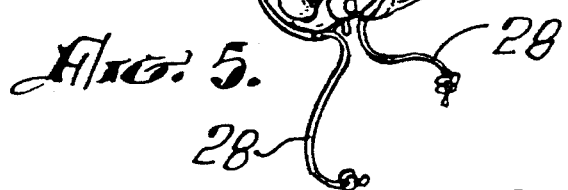
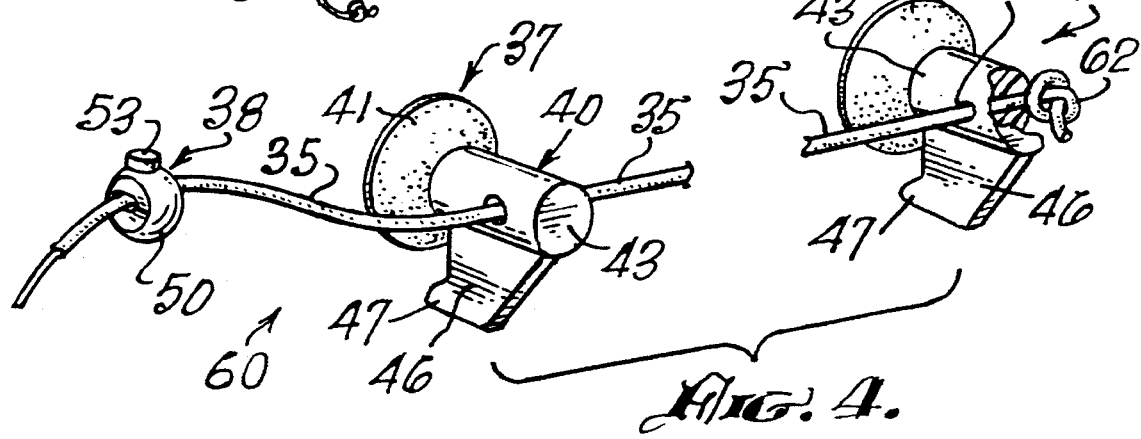

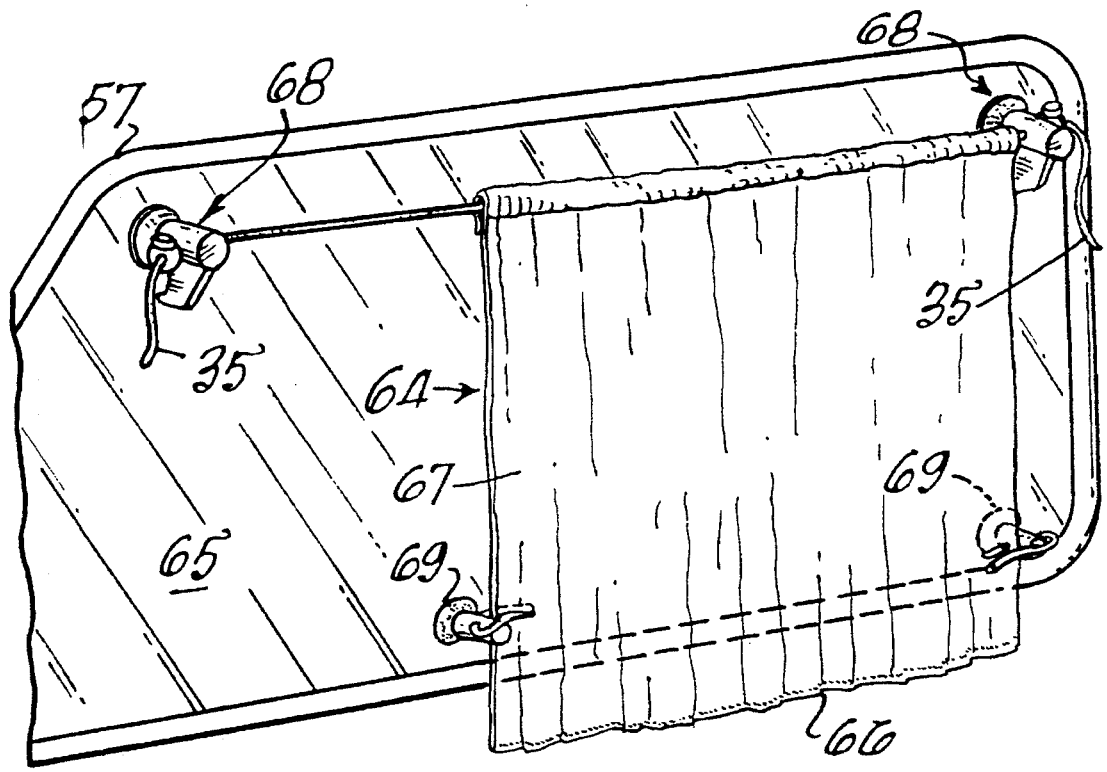
Fig. 6.
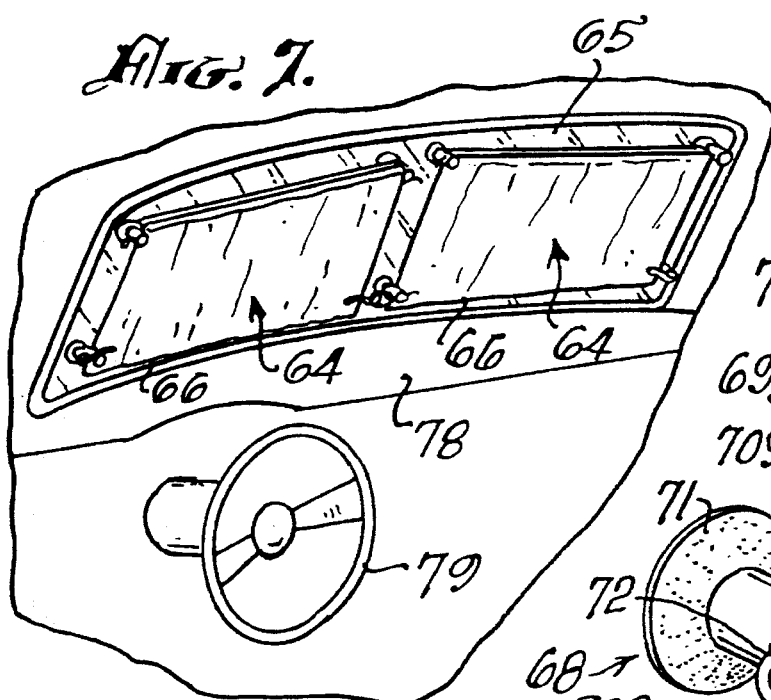
Fig. 7.
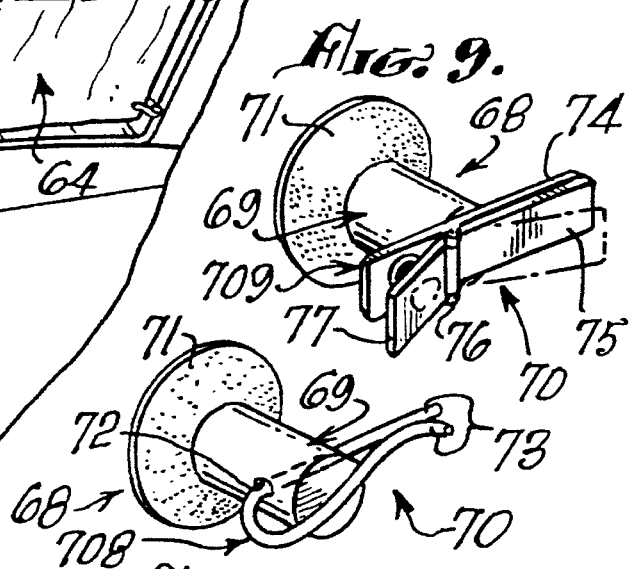
Fig. 9.
Fig. 8.

WINDOW SHADE

TECHNICAL FIELD

This invention relates to shades that prevent light from entering into a given location, and is particularly directed to a portable shade adaptable to transparent panes of vehicle or other location windows.

BACKGROUND TO THE INVENTION

Too much sunlight and other highly visible lighting, glare or the like, at particular angles to the interior of a vehicle, are irritating to its driver and passenger(s), and portable shades to eliminate such annoying and sometimes dangerous phenomenon to the person(s) in the vehicle are in common use today. Some are made to fit the vehicle's windshield specifically, while others are applied to the rear and side windows of the vehicle. With each type or kind, there is/are advantage(s) and disadvantage(s), depending on the person's (driver or passenger) decision to eliminate the phenomenon and the manner best suitable to that person's way of doing it, such manner dictating to the person the kind or type of portable shade to be desired and applied or installed.

The following prior art teachings disclose various manufactures that answer in full or partial degree the noted annoying and possibly dangerous phenomenon: U.S. Pat. Nos. 2,596,836; 3,033,281; 4,647,102; 4,784,426; and 4,893,668. None of them speak to the unique and novel manufacture of this invention.

SUMMARY OF THE INVENTION

This invention provides a reasonable answer to the noted phenomenon, whether applied to a moving vehicle pane or to a stationary window location. It is a manufacture that is versatile, lightweight, easily manipulatable for installation or application, and readily storable in and retrievable from a relatively small bag that can be snuggled into an out-of-the-way pocket someplace, for example, a drawer or compartment proximate to the window either in the vehicle or near a stationary location, when it is not in use.

The subject matter of the invention comprises a curtain formed of generally opaque fabric material that is collapsible and foldable upon itself, and of a size suitable for any window to which the manufacture may be desired to be applied. The curtain includes a hem along its top edge between its two lateral edges, for maintaining a cord to the curtain, the hem preferably disposed substantially at or adjacent to the curtain's top edge. The cord projects out of the hem to form cord extensions of lengths that correspond preferably substantially to the distance between the lateral edges and the ends of the width of the window pane to which the manufacture is to be applied. The cord extensions mount through corresponding means, such as suction cup members, for applying the manufacture to the window pane itself. Means, such as biased button members, for producing a desired tension or slack in the portion of the cord that is disposed between a pair of applying means are mounted to the cord extensions beyond the dispositions of the applying means. In the operation of the invention, depending on the distance between which the applying means are put to a window pane, the producing means can slide along the cord extensions to snug up against them for producing or determining the desired tension or slack in the portion of the cord supporting the hem of the curtain. The width of the curtain then, much like a curtain applied to a house window, is caused to become uncollapsed upon itself, to any degree, full or partial, for disposition across a selected window pane interval about which the applying means has been disposed and mounted to the window pane. The selected interval for the functioning of the uncollapsed curtain may be the full distance between the applying means, or of any lesser distance between them, and along any portion of the length of the cord between the applying means. Legs and toes are mounted to the bodies or stems of the applying means, the toes adapted to engage the window pane, should there not be sufficient rigidity in the applying means to maintain their upright positions relative to the plane of the window pane. An alternative embodiment provides for one end of the cord to be fixed to one of the applying means rather than having it slidable in one direction therethrough to form the substantial part of the cord extensions. Another embodiment provides features that are readily applicable to a slanted window pane, such as a vehicle's windshield.

An object of this invention is to provide a novel and inexpensive window shade.

Another object of this invention is to provide a simple and manipulatable shade before, during and after its application to a window pane or the like.

A further object of this invention is to provide a facile application or installation of the shade, it taking but a few moments to do so.

A still further object of the invention is to provide a compactness of storage of it when not in use, such as in a small fabric bag or the like that can be hidden in an out-of-way place when not in use, but readily available for use on an instance's notice.

Another object of the invention is to provide an installation that does not require removal from its installation of the shade should light be desired to pass through the window pane when the shade in its uncollapsed condition is not in use.

These and other objects and inventions will become more apparent by a full and complete reading of the following description, the appended claims thereto, and the accompanying drawing comprising three (3) sheets of nine (9) FIGURES.

BRIEF DESCRIPTION OF THE DRAWING

FIG. 1 is a perspective view of the manufacture of this invention, as it is applied to and disposed upon a window pane.

FIG. 2 is an exploded perspective view of FIG. 1, omitting the window pane, a portion of the manufacture (its curtain) being omitted.

FIG. 3 is a side elevational or end view of the manufacture in its applied position to a window pane.

FIG. 4 is a perspective view of an alternative embodiment of the manufacture of the invention (its curtain being omitted).

FIG. 5 is a perspective view of the shade of the invention within an opened compactable bag.

FIG. 6 is a perspective view of an application of another embodiment of the invention.

FIG. 7 is a perspective view of the FIG. 6 embodiment applied in one way to a windshield of a vehicle.

FIGS. 8 and 9 perspectively illustrate means for attaching the curtain near its bottom to applying means, such as suction cup members, in the FIG. 6 embodiment.

DESCRIPTION OF THE BEST MODE OF CARRYING OUT THE INVENTION

Referring now to the drawing in which reference characters correspond to like numerals hereinafter, FIG. 1 illustrates the manufacture 20 of this invention in its applied position to a window pane 21 of a vehicle (not shown). It should be understood that the window pane 21 represents any window pane in a vehicle, including its windshield and rear-view window pane, and any window pane in a stationary edifice as well, such as a house, or other building used for a residential, commercial, military or any other purpose. The manufacture 20 comprises a curtain 22 of a suitable length, preferably to at least a length to meet the lowest edge 23 of a window's frame 24, and of a full or uncollapsed width preferably of a dimension substantially meeting the length of the window frame 24, such full or uncollapsed width represented in FIG. 1 by the frame's front and rear edges 25, 26, respectively. The material of the curtain 22 is of a suitable non-see-throughable or see-throughable fabric that eliminates the noted phenomenon, and is foldable upon itself, in the same manner as a house window curtain is, so that the manufacture 20 can be stored in a compact bag 27, FIG. 5, closable by an included looped string 28 at its peripheral opening end 29, when it is not in use. Manufacture 20 also is collapsible upon itself in its operation, as well as for storage purposes. Curtain 22 includes a hem 30 across its width, preferably disposed along its top edge 31, and extending to its lateral edges 32, for maintaining a cord 34 to the curtain 22. Cord 34 projects out of the lateral edges 32 to form extensions 35, FIG. 2, of suitable lengths, i.e., lengths sufficient to mount a means 37 for applying the shade 20 to the window pane 21, and to mount on the cord extensions 35 and beyond the applying means 37 a means 38 for producing tension or slack on the portion of the cord 34 that is disposed between the applying means 37 and from which the curtain 22 hangs.

Each means 37 for applying the shade or manufacture 20 to a window pane 21 is illustrated here as a suction cup member 40, each being disposed (for use) preferably in proximity to a corresponding lateral edge 32 of the curtain 22, though not necessarily in contiguous relationship to them, as in use the curtain's lateral edges 32 in its fullest uncollapsed or opened mode need not be in close proximity to the applying means 37. In use of the manufacture 20, each cup member 40 generally aligns to the depth of the hem 30. Each of these suction cup members 40 comprises a conventional suction cup 41 on the backside of which a stub 42, FIG. 3, is integrally formed, extending from its backside in a generally axial manner, with a top or stem 43, preferably solid, having a recessed end 44 that frictionally or otherwise fixedly attaches to the stub 42. Adjacent the other end of stem or top 43, a bore 45, preferably diametrically, is formed therein for passage therethrough of the corresponding portion of the cord extension 35. A leg 46 and its integral toe 47 are integrally formed to the top or stem 43 of or for each suction cup member 40, the leg 46 extending in a radial direction away from the top or stem while the toe 47 extends in the direction of the suction cup 41 to engage the window pane 21 in application of the manufacture 20 thereto, and thereby maintain the manufacture 20 in an upright manner.

Each producing means 38, mounted on a cord extension 35 beyond each applying means 37, comprises, FIG. 3, a shell or housing 50 having an interior chamber 51 that is open at its top for insertion into it of a spring 52 and a button 53 biased by the spring 52, seated at the bottom of the chamber. Each button 53 has a bore 54 throughout its diametrical dimension and which aligns itself to opposing apertures 55 in the wall 56 of the shell or housing 50 forming the interior chamber 51. Each cord extension 35 extends through the shell's apertured wall 56 and button bore 54, and it is readily apparent from FIG. 3 that the bias of spring 52 forces the button 53 to pinch the portion of the cord passing through the button's bore 54 against the shell's wall 56, thus clamping the cord 34 at that point to the housing 50.

In actual use, the manufacture 20 is removed from its compact state in the bag 27 and is manually unfolded or opened up to a mode generally shown in FIG. 2 (prior to application to the window pane 21). The bottoms of the suction cups 41 are wetted (via water or saliva) and one of them is smacked upon a particular point of the window pane 21 chosen by the user who is desirous of eliminating the indicated phenomenon that is arriving along a particular direction or angle of attack to and through the window pane 21. Using FIGS. 1 and 2 as illustrative, let the suction cup 41 on the right side of the Figures be the first one applied to the window pane 21. The other suction cup member 40 is manipulated into position, here in the illustration, adjacent the juncture 57, FIG. 1, of the top edge 58 and the frontal edge 25 of the window frame 24, its suction cup 41 then being smacked to the window pane 21 in proximity to the juncture 57. Each of the shells or housings 50 is found somewhere along distal portions of the cord extensions 35, and the button 53 in each is depressed to release its producing means 38, for sliding it along the cord extension 35, towards curtain 22, to a point on the cord extension that provides the tension or slack desired on the portion of the cord 34 disposed between the applying means 37. To achieve such sliding to the desired point, the button 53 of each producing means 38 when depressed removes the bias of spring 52 against the cord extension, thereby providing the wherewithal to slide the producing means 38 to its desired point. The positioning of the curtain 22 along the tensed or slackened cord 34 between the applying means 37 then is addressed, as by now both of the illustrated producing means 38 have snugged up against their corresponding applying means 37. The hem 30 of the curtain 22 is moved along the cord 34, between the applying means 37, to a desired location thereby achieving the noted purpose, regardless of the curtain being fully extended upon itself or partially collapsed upon itself, and regardless of whether either mode of the curtain extends fully between the applied means 37. In other words, the curtain's workable width, fully open or partially collapsed, may be adjusted across the distance between the applied means 37, to any desired length of such distance. Further, the positions of the applying means 37 are not limited to any particular level relative to the frame 24 of the window pane 21, but at any level of the pane itself. The manufacture 20 may also be applied to the interior of the vehicle or stationary location where a window pane is not available for applying it thereto, the applying means 37 being appropriately applied or changed in construction for applying it to a structural frame or support to which suction cups are not applicable. Also what a user may do, is to first determine the line of direction of the phenomenon to the window pane 21 and thereafter apply the manufacture 20 in such a way as to eliminate its annoyance or danger for an estimated period of time, as the vehicle moves along its roadway. For a stationary location, the angle of attack changes relative to the location as time goes on, and the user should change the position of the manufacture or its curtain as the changing conditions demand. In either case, should the angle of attack of the phenomenon change so as to not need the manufacture 20's function of elimination, it need not be removed from the window pane 21 or its stationary location, but merely its curtain 22 brushed back into a more collapsed yet open condition, to a position that opens a view through the window pane 21, the manufacture 20 remaining in a stand-by mode for functioning again as an eliminator.

Assembly of the manufacture 20 is readily apparent from an inspection of its fabricated parts and the above description. The cord 34 is passed through the hem 30 each of its ends then being passed through the bores 54 in the suction cup members 40. Thereafter each producing means 38 is mounted to the cord by depressing its corresponding button 53 for passage of the cord through it. The manufacture 20 is ready for use.

FIG. 4 illustrates an alternative embodiment 60, in which one end of the cord 34 is knotted, as at 62, the knot 62 fixedly positioned against or engaging the stem 43 of its one corresponding applying means, such as suction cup member 40. Knot 62 may be formed not necessarily at the end of a cord extension 35 but may also be formed along a portion of its cord extension 35. Only one producing means 38 is utilized adjacent the suction cup member 40 of the other applying means 37.

FIGS. 6 through 9 illustrate another embodiment 64 of the invention, where it is useful in its application to a window pane 65 that is slanted in orientation as well such as found in the orientation of today's vehicular windshields. The bottom edge 66 of the curtain 67 lies adjacent the bottom of the pane or windshield 65, FIG. 7. Applying means 68, FIGS. 8, 9, preferably a pair of them such as spaced suction cup members 69, are securely fixed, such as by one or more of a number of clip means 70, FIGS. 8 or 9, to the lateral sides of the curtain 67, FIG. 6, facing the pane 65. As the shade 64 is mounted to the windshield 65 its suction cups 71 of their corresponding members 69 are applied as well to the windshield 65 in the same manner as are the upper applying means 37 of the shade illustrated in FIGS. 1–6. FIG. 8 illustrates a clip 708, much like a cotter or hair pin, that is connected to the stem of its suction cup member through a suitable bore 72, the clip 708 itself being pinned to a corresponding edge 32 of a curtain, the legs 73 of the clip being conventionally spring-biased towards one another to so engage the curtain. FIG. 9 illustrates a clip 709 comprising fingers 74, 75, conventionally joined together by a tension spring 767, the one finger 74 being glued to the top (43, but the gluing hot seen in FIG. 9) of a stem of its corresponding suction cup member 69, while the other finger 75 includes an angled finger grip 77 that opens and closes the fingers 74, 75 about a lateral edge 32 of a curtain the curtain 67. The shade 64 is positioned in a parallel manner in its application to the windshield 65, and out of the way, say, of a dashboard 78 in front of a steering wheel 79 for a vehicle (not shown) as well as being out of the way of the vehicle's driver and/or passenger. The shade 64 may be opened or closed to any extent, in the same way as in the previously described embodiments 20, 60, and need not be removed from the windshield 65, or any window pane, when in a closed or non-used mode. The shade 64 may be of a size to cover substantially the entire length and depth of the windshield 65 or other window pane, or just one half as illustrated in FIG. 7, or to any degree of its length thereof, so that either side, driver's or passenger's, behind the windshield 65, may be serviced by the shade applied to it.

The aforescribed elements are formed of suitable and known materials. Curtain material, plastic, man-made fiber material, or other sheet-like material may be used to form curtain 22, as long as it is collapsible. Suction cups are notoriously old and top or stem 43 may be integrally formed therewith or it may be separately fabricated, as shown, in wood, metal, plastic, or other suitable material, to fit upon the stub 42 of the suction cup 41. The leg 46 and toe 47 may be integrally formed with the top or stem 43. The cord 34 is made from any length of known material used for ropes, cables, strings, etc.

Various changes and modifications may be made in the illustrated manufactures 20, 60, 64 without departing from the scope and spirit of the invention and the appended claims hereto. The cord 34 need not be slidable within the hem 30 or other means for maintaining it to its curtain 22. The hem 30 or other maintaining means need not be a continuous one at the top of the curtain. Preferably a maintaining means is located at or substantially at the top edge of the curtain 22. Two (2) cords, that are described hereby as cord extensions 35, may be used, without the need for a hem 30, the ends of the two extensions 35, as maintaining means for the cord means, being sewn or otherwise fixed to the lateral edges 32 of the curtain 22, however, such a variation restricts a manufacture to a fixed-width for a fully opened curtain 22, thus possibly limiting use of the manufacture to a particularly-sized area of a window pane. The knot 62 may be adapted to one of the cord extensions 35 whose ends are sewn or otherwise fixed to the lateral edges 32 of the curtain 22. The legs 46 and toes 47 need not be included in the manufacture should the suction cup members 40, be sufficiently rigid to maintain a substantially upright position relative to the plane of the window pane 21. The elements of the suction cup members 40, may be of integral form. The knot 62 can also be located within, say, a hollowness formed in the top or stem 43. The top or stem 43 need not be solid. Members 69 also may be adapted to the embodiments 20 and 60. The location or position of the clips 708 and 709 need not be limited to points along the lateral edges 32 but may also be located or positioned at points along the bottom edge 66 of the curtain 22, curtains 22, 67 or can be a combination of both.

INDUSTRIAL APPLICATION

The invention is used primarily in vehicles whose window panes are struck by rays of light that are the source of the noted phenomenon and to eliminate same, however, it should be understood that the invention may be used elsewhere also, such as on a building's window pane, as well as for other suitable purposes.

I claim:

1. A window shade comprising a curtain having lateral edges, cord means having opposing ends, means for maintaining said cord means on said curtain, extensions on each said cord means ends projecting past a respective one of said lateral edges, means for applying the shade to a window pane mounted on each of said extensions, adjusting means mounted to each of said extensions on side of said applying means opposite to a respective lateral edge for producing a desired slack or tension on the portion of the cord means disposed between said applying means, said adjusting means comprising means for releasably gripping a corresponding one of said extensions.

2. The shade of claim 1 wherein said maintaining means comprises ends of the extensions fixed to said curtain.

3. The shade of claim 1 wherein
said cord means and maintaining means are slidable relative to one another.

4. The shade of claim 3 wherein
said maintaining means comprises hem means in the curtain and disposed between said lateral edges, said hem means supporting a portion of said cord means.

5. The shade of claim 2 or claim 3 or claim 4 wherein each of said applying means comprises a suction cup member.

6. The shade of claim 5 wherein
said adjusting means comprises
a button member that comprises
a shell having a wall forming an interior chamber, opposing apertures in said wall, and
a spring-biased button reciprocally mounted in said chamber and having a bore in general alignment with said opposing apertures,
the corresponding one of said extensions passing through said apertures and button bore, the spring-biasing of said button pinching the corresponding one of said extensions at a point to thereby produce the desired tension of slack in the portion of the cord means disposed between said applying means.

7. The shade of claim 5 wherein
said suction cup member comprises
a suction cup and a stem mounted thereon,
said stem having a bore through it, a corresponding one of said extensions extending through and past said bore.

8. The shade of claim 7 wherein
said button member comprises
a shell having a wall forming an interior chamber, opposing apertures in said wall, and
a spring-biased button reciprocally mounted in said chamber and having a bore in general alignment with said opposing apertures,
the corresponding one of said extensions passing through said apertures and button bore, the spring-biasing of said button pinching the corresponding one of said extensions at a point to thereby produce the desired tension of slack in the portion of the cord means disposed between said applying means.

9. The shade of claim 8 wherein
said stem includes a leg and a toe mounted to said leg,
the toe adapted to maintain the suction cup member in a substantially upright position relative to the plane of the window pane or the like to which the applying means is to be mounted.

10. The shade of claim 9 wherein
said button member comprises
a shell having a wall forming an interior chamber, opposing apertures in said wall, and
a spring-biased button reciprocally mounted in said chamber and having a bore in general alignment with said opposing apertures,
the corresponding one of said extensions passing through said apertures and button bore, the spring-biasing of said button pinching the corresponding one of said extensions at a point to thereby produce the desired tension of slack in the portion of the cord means disposed between said applying means.

11. The shade of claim 1 wherein
at least one of said adjusting means comprises
a knot formed in one of said extensions for engaging a corresponding one of said applying means.

12. The shade of claim 1 or claim 2 or claim 3 or claim 4 or claim 11 wherein
at least one of said adjusting means comprises
a button member.

13. The shade of claim 12 wherein
said button member comprises
a shell having a wall forming an interior chamber, opposing apertures in said wall, and
a spring-biased button reciprocally mounted in said chamber and having a bore in general alignment with said opposing apertures,
the corresponding one of said extensions passing through said apertures and button bore, the spring-biasing of said button pinching the corresponding one of said extensions at a point to thereby produce the desired tension of slack in the portion of the cord means disposed between said applying means.

14. The shade of claim 1 wherein
said curtain includes a bottom edge and other applying means mounted to said curtain adjacent said bottom edge.

15. The shade manufacture of claim 14 wherein
said maintaining means comprises ends of the extensions fixed to said curtain.

16. The shade of claim 14 wherein
said cord means and maintaining means are slidable relative to one another.

17. The shade of claim 14 or claim 16 wherein
said maintaining means comprises hem means in the curtain and disposed between said lateral edges, said hem means supporting a portion of said cord means.

18. The shade of claim 17 wherein
each of said applying means comprises a suction cup member.

19. The shade of claim 18 wherein
said suction cup member comprises
a suction cup and a stem mounted thereon,
said stem having a bore through it, a corresponding one of said extensions extending through and past said bore.

20. The shade of claim 19 wherein
said stem includes a leg and a toe mounted to said leg,
the toe adapted to maintain the suction cup member in a substantially upright position relative to the plane of the window pane or the like to which the applying means is mounted.

21. The shade of claim 20 wherein each of said adjusting means comprises a button member.

22. The shade of claim 21 wherein
said button member comprises
a shell having a wall forming an interior chamber, opposing apertures in said wall, and
a spring-biased button reciprocally mounted in said chamber and having a bore in general alignment with said opposing apertures,
the corresponding one of said extensions passing through said apertures and button bore, the spring-biasing of said button pinching the corresponding one of said extensions at a point to thereby produce the desired tension of slack in the portion of the cord means disposed between said applying means.

23. The shade of claim 19 wherein each of said adjusting means comprises a button member.

* * * * *